United States Patent [19]
Dammert et al.

[11] Patent Number: 5,891,979
[45] Date of Patent: Apr. 6, 1999

[54] TINORGANIC CATALYST WITH INCREASED CROSSLINKING SPEED FOR SILANE CROSSLINKING REACTIONS

[75] Inventors: Ruth Dammert, Helsinki; Bernt-Åke Sultan, BorgÅ, both of Finland

[73] Assignee: Borealis Holding A/S, Lyngby, Denmark

[21] Appl. No.: 669,276
[22] PCT Filed: Aug. 25, 1994
[86] PCT No.: PCT/SE94/00773
§ 371 Date: Jul. 30, 1996
§ 102(e) Date: Jul. 30, 1996
[87] PCT Pub. No.: WO95/17464
PCT Pub. Date: Jun. 29, 1995

[30] Foreign Application Priority Data

Dec. 20, 1993 [SE] Sweden ............................... 9304201-8

[51] Int. Cl.$^6$ .................................................. C08G 77/08
[52] U.S. Cl. .............................. 528/18; 528/23; 525/100; 525/105; 525/106; 526/279

[58] Field of Search ................................... 528/17, 18, 23; 525/100, 105, 106; 526/279

[56] References Cited

FOREIGN PATENT DOCUMENTS

| 0207627 | 7/1987 | European Pat. Off. . |
| 0401540 | 12/1990 | European Pat. Off. . |
| 56-065667 | 3/1981 | Japan . |

*Primary Examiner*—Melvyn I. Marquis
*Attorney, Agent, or Firm*—Merchant, Gould, Smith, Edell, Welter & Schmidt

[57] ABSTRACT

A cross-linkable polymer composition contains a cross-linkable polymer with hydrolysable silane groups and at least one silanol condensation catalyst. The polymer composition is distinguished by the silanol condensation catalyst being a tinorganic compound of formula (I); $RSn(OH)_k X_1 OSn(OH)_m X_n R'$, wherein R and R' are hydrocarbon radicals, R' being the same as or different from R, X is a halogen, h is 1 or 2, j is 1 or 2, h+j=3, k, l, m and n are 1 or 2, k+l=2, m+n=2 and at least one of l and n is different from 0. Preferably, the composition contains 0.0001–3% by weight of the silanol condensation catalyst.

10 Claims, No Drawings

TINORGANIC CATALYST WITH INCREASED CROSSLINKING SPEED FOR SILANE CROSSLINKING REACTIONS

The present invention relates to a crosslinkable polymer composition containing a crosslinkable polymer with hydrolysable silane groups and at least one silanol condensation catalyst.

It is known to crosslink different polymers by means of additives. Crosslinking improves such properties of the polymer as its mechanical strength and heat resistance. Polymers normally considered to be thermoplastics, and not crosslinkable, can also be crosslinked by introducing crosslinkable groups in the polymer. An example thereof is the crosslinking of polyolefins, such as polyethylene. A silane compound can be introduced as a crosslinkable group, e.g. by grafting the silane compound onto the prepared polyolefin, or by copolymerisation of the olefin and the silane compound. This technique is previously known, and further details may be obtained from U.S. Pat. Nos. 4,413,066; 4,297,310; 4,351,876; 4,397,981; 4,446,283; and 4,456,704, all of which are incorporated herein by reference.

The crosslinking of polymers with hydrolysable silane groups is carried out by so-called moisture curing. In a first step, the silane groups are hydrolysed under the influence of water, resulting in the splitting-off of alcohol and the formation of silanol groups. In a second step, the silanol groups are crosslinked by a condensation reaction splitting off water. In both steps, a so-called silanol condensation catalyst is used as catalyst.

Prior-art silanol condensation catalysts include carboxylates of metals, such as tin, zinc, iron, lead and cobalt; organic bases; inorganic acids; and organic acids.

Mention should here especially be made of dibutyl tin dilaurate (DBTDL), dibutyl tin diacetate, dioctyl tin dilaurate, stannous acetate, stannous caprylate, lead naphthenate, zinc caprylate, cobalt naphthenate, ethyl amines, dibutyl amine, hexylamines, pyridine, inorganic acids, such as sulphuric acid and hydrochloric acid, as well as organic acids, such as toluene sulphonic acid, acetic acid, stearic acid and maleic acid. Especially the tin carboxylates are much used as catalysts.

WO 91/09075 further discloses the use of a blocked acid, such as an acid anhydride, e.g. stearic acid anhydride or benzoic acid anhydride, as silanol condensation catalyst. Such catalysts counteract undesirable premature crosslinking, commonly referred to as scorching or precuring, of the polymer composition.

GB 2,028,831 and EP 0,193,317 may be mentioned as examples of the prior art relating to the crosslinking of polymers containing hydrolysable silane groups by means of the above-mentioned silanol condensation catalysts. EP 0,207,627 also discloses the use of a special silanol condensation catalyst in the form of a tin-containing polymer.

Although the above silanol condensation catalysts, and in particular the tin carboxylates, are frequently used in the crosslinking of polymer compositions containing silanol groups, they are disadvantageous in some respects. Thus, efforts are being made to find silanol condensation catalysts reducing or obviating these disadvantages.

For instance, prior-art silanol condensation catalysts function satisfactorily only at elevated temperatures in the order of 80°–100° C. and give a poor performance at normal ambient temperatures and relative humidities, such as room temperature (about 20°–25° C.) and 50% RH. In many contexts, such as the production of cable insulations or water pipes, it is desirable that the silane-containing polymer composition can be crosslinked at room temperature without the use of water baths or steam cabinets. The degree of crosslinking of the polymer composition is measured as the gel content after crosslinking at a certain temperature for a certain period of time. It is desirable that crosslinking at room temperature for four days should result in a gel content of at least about 65% and a catalyst loading of about 1 mmole/kg composition. This is not achieved by existing silanol condensation catalysts, and it would therefore be a considerable step forward to provide a silanol condensation catalyst meeting this requirement.

The present invention relates to a new kind of silanol condensation catalyst reducing or obviating the drawbacks of prior-art catalysts in the crosslinking of polymer compositions containing polymers with hydrolysable silane groups. More precisely, the inventive silanol condensation catalyst consists of certain tinorganic compounds enabling crosslinking of silane-containing polymer compositions at room temperature.

The invention thus provides a crosslinkable polymer composition containing a crosslinkable polymer with hydrolysable silane groups and at least one silanol condensation catalyst, said polymer composition being characterised in that the silanol condensation catalyst comprises a tinorganic compound of formula I or II

wherein R and R' are hydrocarbon radicals, R' being the same as or different from R, X is a halogen, h is 1 or 2, j is 1 or 2, h+j=3, k, l, m and n are 0, 1 or 2, k+l=2, m+n=2 and at least one of l and n is different from 0. It is to be noted that also water of crystallisation may be present in compounds I and II.

Further characteristics and advantages of the invention are apparent from the appended claims and the following description.

In the inventive silanol condensation catalysts of formula I or II, R and R' are hydrocarbon radicals preferably selected from the group consisting of alkyl, alkenyl, cycloalkyl, aralkyl, aryl and alkaryl. These radicals may be unsubstituted or substituted with inert substituents, i.e. unreactive substituents, such as alkyl, aryl, cycloalkyl, aralkyl and alkaryl.

When the hydrocarbon radical R or R' is an alkyl, it typically is an alkyl group with a straight or branched chain, including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl, and octadecyl. Preferably, use is made of a lower alkyl group having 3–12 carbon atoms.

When the hydrocarbon radical R or R' is alkenyl, it typically is vinyl, allyl, 1-propenyl, methallyl, butenyl, pentenyl, hexenyl, heptenyl, octenyl, decenyl, dodecenyl, tetradecenyl or octadecenyl.

When the hydrocarbon radical R or R' is cycloalkyl, it typically is cyclopentyl, cyclohexyl, cycloheptyl or cyclooctyl.

When the hydrocarbon radical R or R' is aralkyl, it typically is benzyl, β-phenylethyl, γ-phenylpropyl or β-phenylpropyl.

When the hydrocarbon radical R or R' is aryl, it typically is phenyl or naphthyl.

When the hydrocarbon radical R or R' is alkaryl, it typically is tolyl, xylyl, p-ethylphenyl or p-nonylphenyl.

It is especially preferred that the hydrocarbon radical R or R' is an unsubstituted straight alkyl radical having 3–12 carbon atoms, and it is most preferred that R is butyl or octyl because of their commercial availability.

In the silanol condensation catalyst of formula I or II, X is a halogen suitably selected from fluorine, chlorine, bromine and iodine. Preferably, X is chlorine.

In formula I, h is 1 or 2, j is 1 or 2, and m+n=3. Preferably, h is 2 and j is 1, i.e. the compound contains two hydroxyl groups.

The currently most preferred silanol condensation catalysts of formula I according to the invention are butyl tin dihydroxide chloride and octyl tin dihydroxide chloride.

In formula II, k, l, m and n are 0, 1 or 2, k+l=2, m+n=2 and at least one of l and n is different from 0. Preferably, both k and m are different from 0 and at least one of l and n is l, i.e. the compound contains at least two hydroxyl groups and at least one halogen.

The silanol condensation catalysts of formulae I and II according to the invention consist of known compounds or can be prepared by known methods, e.g. as described by Luijten, J. G. A., Investigation on Organotin Compounds. XXII. Hydrolysis Products of Alkyltin Trichlorides, Recl. Trav. Chim. Pays-Bas, 85(8), pp. 873–878 or U.S. Pat. No. 3,480,655. These compounds are previously known for use as fungicides, stabilisers for resins or additives to antifouling paint, but not for use as silanol condensation catalysts.

According to the invention, the amount of silanol condensation catalyst present in the crosslinkable polymer composition generally is in the order of 0.001–3% by weight, preferably 0.001–1% by weight and most preferably 0.002–0.5% by weight, as based on the amount of silanol group containing polymers in the composition. It will be appreciated that the effective amount of catalyst depends on the molecular weight of the catalyst. Thus, a smaller amount is required of a catalyst having a low molecular weight, than of a catalyst having a high molecular weight.

The inventive catalyst is preferably added to the crosslinkable polymer in the form of a master batch, i.e. mixed with a polymer, such as a homo- or copolymer of ethylene, e.g. PE-LD or EBA containing 3–30% by weight of butyl acrylate. The master batch contains a minor amount of the catalyst, generally about 0.1–10% by weight, preferably about 0.1–5% by weight.

The inventive catalyst may be used in the crosslinkable polymer composition alone or combined with other silanol condensation catalysts, such as other catalysts of formula I or II, or conventional silanol condensation catalysts, e.g. carboxylic acid salts of the metals tin, zinc, iron, lead and cobalt; organic bases; inorganic acids; and organic acids, including organic sulphonic acids.

The crosslinkable polymer composition according to the invention chiefly corresponds to prior art crosslinkable polymer compositions containing hydrolysable silane groups, but differs therefrom by containing the silanol condensation catalyst described above.

Thus, the invention generally concerns crosslinkable polymers containing hydrolysable silane groups, and more precisely it relates to olefin copolymers or graft polymers which contain hydrolysable silane groups and which are crosslinked under the influence of water and at least one silanol condensation catalyst. Preferably, the crosslinkable polymer is an ethylene homopolymer or copolymer containing crosslinkable silane groups introduced either by copolymerisation or graft polymerisation.

Preferably, the silane-containing polymer has been obtained by copolymerisation of an olefin, suitably ethylene, and an unsaturated silane compound represented by the formula

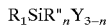  (III)

wherein
R$_1$ is an ethylenically unsaturated hydrocarbyl, hydrocarbyloxy or (meth)acryloxy hydrocarbyl group,
R" is an aliphatic saturated hydrocarbyl group,
Y which may be same or different, is a hydrolysable organic group, and
n is 0, 1 or 2.

If there is more than one Y group, these do not have to be identical.

Special examples of the unsaturated silane compound are those wherein R$_1$ is vinyl, allyl, isopropenyl, butenyl, cyclohexenyl or gamma-(meth)acryloxy propyl; Y is methoxy, ethoxy, formyloxy, acetoxy, propionyloxy or an alkyl- or arylamino group; and RΔ, if present,.is a methyl, ethyl, propyl, decyl or phenyl group.

A preferred unsaturated silane compound is represented by the formula $$CH_2=CHSi(OA)_3 \quad \quad (IV)$$

wherein A is a hydrocarbyl group having 1–8 carbon atoms, preferably 1–4 carbon atoms.

The most preferred compounds are vinyl trimethoxysilane, vinyl bismethoxyethoxysilane, vinyl triethoxysilane, gamma-(meth) acryloxypropyltrimethoxysilane, gamma(meth) acryloxypropyltriethoxysilane, and vinyl triacetoxysilane.

The copolymerisation of the olefin (ethylene) and the unsaturated silane compound may be carried out under any suitable conditions resulting in the copolymerisation of the two monomers.

Moreover, the copolymerisation may be implemented in the presence of one or more other comonomers which can be copolymerised with the two monomers. Such comonomers include (a) vinyl carboxylate esters, such as vinyl acetate and vinyl pivalate, (b) alpha-olefins, such as propene, 1-butene, 1-hexene, 1-octene and 4-methyl-1-pentene, (c) (meth)acrylates, such as methyl(meth)acrylate, ethyl(meth) acrylate and butyl(meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-methyl styrene. Amongst these comonomers, vinyl esters of monocarboxylic acids having 1–4 carbon atoms, such as vinyl acetate, and (meth)acrylate of alcohols having 1–4 carbon atoms, such as methyl(meth)acrylate, are preferred. Especially preferred comonomers are butyl acrylate, ethyl acrylate and methyl acrylate. Two or more such olefinically unsaturated compounds may be used in combination. The term '(meth)acrylic acid' is intended to embrace both acrylic acid and methacrylic acid. The comonomer content of the copolymer may amount to 70% by weight of the copolymer, preferably about 0.5–35% by weight, most preferably about 1–30% by weight.

If using a graft polymer, this may e.g. have been produced by any of the two methods described in U.S. Pat. No. 3,646,155 and U.S. Pat. No. 4,117,195, respectively.

The silane-containing polymer according to the invention suitably contains 0.001–15% by weight of the silane compound, preferably 0.01–5% by weight, most preferably 0.1–3% by weight.

As is usually the case for polymer compositions, the crosslinkable polymer may contain various additives, such as miscible thermoplastics, stabilisers, lubricants, fillers, colouring agents and foaming agents.

As to the miscible thermoplastics added, mention may be made of miscible polyolefins, such as polyethylene of low density, medium density and high density, polypropene, chlorinated polyethylene, as well as various copolymers including ethylene and one or more other comonomers, e.g. vinyl acetate, methyl acrylate, propene, butene, hexene and the like. One may use either a single polyolefin or a mixture of several polyolefins. The polyolefin content of the composition may be up to 70% by weight, as based on the total amount of this polyolefin and the silane-containing polymer.

As to fillers, mention may be made of inorganic fillers, such as silicates, e.g. kaolin, talc, montmorillonite, zeolite, mica, silica, calcium silicate, asbestos, powdered glass, glass fibre, calcium carbonate, gypsum, magnesium carbonate, magnesium hydroxide, aluminium hydroxide, carbon black and titanium oxide. The content of the inorganic filler may be up to 60% by weight, as based on the sum of the weights of the filler and the silane-containing polymer.

Finally, it should be observed that the crosslinkable polymer used in the invention is previously known and that the novel and distinctive features of the invention thus do not reside in this polymer, but in the special silanol condensation catalyst added to the polymer to form the inventive polymer composition.

The following nonrestrictive Examples are incorporated herein to further illustrate the invention.

EXAMPLE 1A

A silanol condensation catalyst was added to a crosslinkable polymer containing hydrolysable silane groups. The polymer used was a copolymer of ethylene and vinyl trimethoxysilane, in which the amount of silane was 2% by weight. The silanol condensation catalyst used was butyl tin dihydroxide chloride. The catalyst was added with low-density polyethylene in the form of a masterbatch containing 16 mmole/kg of catalyst. This masterbatch was added in three different quantities so that the amount of catalyst in the final composition was approximately 0.8, 1.6 and 2.4 mmole/kg.

The composition was crosslinked at a temperature of 90° C. in the presence of water. The degree of crosslinking was measured by decalin extraction according to the UNI 459 method. This method is in accordance with ASTM D 2756, except that, after an extraction with decalin for 6 h, the extraction was continued for 1 h in new pure, boiling decalin. The results are shown in Table 1A below, and the given values are the mean values of two determined values.

TABLE 1A

| Butyl tin dihydroxide chloride | Crosslinking degree (%) at 90° C. after | | | |
|---|---|---|---|---|
| (mmole/kg) | 0.25 h | 0.5 h | 1 h | 2 h |
| 0.8 | 62 | 70 | 77 | 79 |
| 1.6 | 67 | 75 | 79 | 81 |
| 2.4 | 73 | 76 | 81 | 81 |

Example 1B (Comparative)

For comparative purposes, the crosslinking experiment of Example 1A was carried out at 90° C., but using the same molar amounts of dibutyl tin dilaurate (DBTDL) and Sn(II) octoate as catalysts. The results are shown in Table 1B below.

TABLE 1B

| Crosslinking catalyst | Crosslinking degree (%) at 90° C. after | | | |
|---|---|---|---|---|
| (mmole/kg) | 1.5 h | 3 h | 6 h | 20 h |
| DBTDL | | | | |
| 0.8 | 53 | 59 | 73 | 79 |
| 1.6 | 62 | 74 | 77 | 80 |
| 2.4 | 77 | 80 | 79 | 82 |
| Sn(II)octoate | | | | |
| 0.8 | 67 | 74 | 74 | 71 |
| 1.6 | 78 | 78 | 80 | 77 |
| 2.4 | 78 | 79 | 80 | 81 |

EXAMPLE 2A

Crosslinking experiments were carried out as in Example 1A, except that the crosslinking temperature was 80° C. The results are shown in Table 2A below.

TABLE 2A

| Butyl tin dihydroxide chloride | Crosslinking degree (%) at 80° C. after | | | |
|---|---|---|---|---|
| (mmole/kg) | 1 h | 2 h | 4 h | 7 h |
| 0.8 | 77 | 77 | 77 | 79 |
| 1.6 | 79 | 79 | 81 | 83 |
| 2.4 | 80 | 79 | 81 | 83 |

Example 2B (Comparative)

Comparative Example 1B was repeated at 80° C. The results are shown in Table 2B below.

TABLE 2B

| Crosslinking catalyst | Crosslinking degree (%) at 80° C. after | | | |
|---|---|---|---|---|
| (mmole/kg) | 2 h | 4 h | 7 h | 20 h |
| DBTDL | | | | |
| 0.8 | 53 | 57 | 67 | 75 |
| 1.6 | 63 | 66 | 88 | 79 |
| 2.4 | 68 | 76 | 89 | 79 |
| Sn(II)octoate | | | | |
| 0.8 | 61 | 68 | 71 | 74 |
| 1.6 | 73 | 78 | 77 | 78 |
| 2.4 | 79 | 79 | 80 | 80 |

EXAMPLE 3A

Crosslinking experiments were carried out as in Example 1A, except that the crosslinking temperature was 60° C. The results are shown in Table 3A below.

TABLE 3A

| Butyl tin dihydroxide chloride | Crosslinking degree (%) at 60° C. after | | | |
|---|---|---|---|---|
| (mmole/kg) | 2 h | 5 h | 7 h | 17 h |
| 0.8 | 64 | 72 | 78 | 77 |
| 1.6 | 66 | 77 | 77 | 80 |
| 2.4 | 72 | 77 | 79 | 81 |

Example 3B (Comparative)

Comparative Example 1B was repeated at 60° C. The results are shown in Table 3B below.

TABLE 3B

| Crosslinking catalyst | Crosslinking degree (%) at 60° C. after | | |
|---|---|---|---|
| (mmole/kg) | 5 h | 7 h | 20 h |
| DBTDL | | | |
| 0.8 | 51 | 56 | 64 |
| 1.6 | 62 | 63 | 87 |
| 2.4 | 65 | 70 | 86 |
| Sn(II)octoate | | | |
| 0.8 | 63 | 65 | 72 |
| 1.6 | 74 | 75 | 78 |
| 2.4 | 80 | 76 | 79 |

EXAMPLE 4

Crosslinking experiments were carried out as in Example 1A, except that the crosslinking temperature was 40° C. For comparative purposes, the same test was carried out but using dibutyl tin dilaurate and Sn(II)octoate as catalysts. The results are shown in Table 4 below.

TABLE 4

| Crosslinking catalyst | Crosslinking degree (%) at 40° C. after | | | |
|---|---|---|---|---|
| (mmole/kg) | 5 h | 16 h | 24 h | 48 h |
| Butyl tin dihydroxide chloride | | | | |
| 0.8 | 56 | 66 | 78 | 79 |
| 1.6 | 69 | 78 | 80 | 79 |
| 2.4 | 70 | 85 | 80 | 79 |
| DBTDL | | | | |
| 0.8 | 8 | 39 | 50 | 59 |
| Sn(II)octoate | | | | |
| 0.8 | 44 | 60 | 63 | 61 |

EXAMPLE 5A

Crosslinking experiments were carried out as in Example 1A, except that the crosslinking was performed at room temperature (23° C., 50% RH). The results are shown in Table 5A below.

TABLE 5A

| Butyl tin dihydroxide chloride | Crosslinking degree (%) at 23° C. (50% RH) after | | | |
|---|---|---|---|---|
| (mmole/kg) | 2 days | 4 days | 10 days | 15 days |
| 0.8 | 54 | 63 | 69 | 73 |
| 1.6 | 66 | 70 | 74 | 76 |
| 2.4 | 68 | 73 | 78 | 78 |

Example 5B (Comparative)

Comparative Example 1B was repeated at 23° C. (50% RH). The results are shown in Table 5B below.

TABLE 5B

| Crosslinking catalyst | Crosslinking degree (%) at 23° C. (50% RH) after | | |
|---|---|---|---|
| (mmole/kg) | 7 days | 14 days | 28 days |
| DBTDL | | | |
| 0.8 | 46 | 59 | 61 |
| 1.6 | 62 | 68 | 69 |
| 2.4 | 65 | 72 | 73 |
| Sn(II)octoate | | | |
| 0.8 | 13 | 19 | 26 |
| 1.6 | 53 | 58 | 60 |
| 2.4 | 63 | 59 | 65 |

In addition, dibutyl tin maleate, also a previously known catalyst, was tested under the same conditions at a catalyst concentration of 0.8 mmole/kg, and gave a degree of cure of 26% after 5 days.

EXAMPLE 6

Example 1A was repeated, using butyl tin dihydroxide chloride and octyl tin dihydroxide chloride as catalysts. For comparative purposes, DBTDL and Sn(II)octoate were used as catalysts. The amount of crosslinking catalyst used was 0.8 mmole/kg in each case. Crosslinking was carried out at different temperatures and for different periods of time, as shown in Table 6 together with the results of the crosslinking experiments.

TABLE 6

| Crosslinking catalyst | Crosslinking degree (%) after | | | |
|---|---|---|---|---|
| | 1.5 h at 90° C. | 4 h at 80° C. | 17 h at 60° C. | 4 days at 23° C. (50% RH) |
| Butyl tin dihydroxide chloride | 75 | 77 | 77 | 68 |
| Octyl tin dihydroxide chloride | 84 | 79 | 80 | 65 |
| DBTDL | 53 | 57 | 58 | 55 |
| Sn(II)octoate | 64 | 57 | 65 | 36 |

As appears from the above Examples, the inventive silanol condensation catalysts of formula I, exemplified above by butyl tin dihydroxide chloride and octyl tin dihydroxide chloride, exhibit much better crosslinking at room temperature, as well as more rapid crosslinking at elevated temperatures, than conventional silanol condensation catalysts, exemplified above by dibutyl tin dilaurate (DBTDL) and Sn(II)octoate. Thus, the inventive silanol condensation catalysts are superior in these respects.

We claim:

1. A crosslinkable polymer composition comprising a crosslinkable polymer with hydrolysable silane groups and at least one silanol condensation catalyst, wherein the silanol condensation catalyst comprises a tinorganic compound of formula I or II $$RSn(OH)_h X_j \qquad \text{I:}$$

$$RSn(OH)_k X_l OSn(OH)_m X_n R' \qquad \text{II:}$$

wherein R and R' are hydrocarbon radicals, R' being the same as or different from R, X is a halogen, h is 1 or 2, j is 1 or 2, h+j=3, k, l, m and n are 0, 1 or 2, k+l=2, m+n=2 and at least one of l and n is different from 0.

2. A polymer composition according to claim 1, wherein R and R' are individually an alkyl, an alkenyl, a cycloalkyl, an aralkyl, an aryl, or an alkaryl hydrocarbon radical.

3. A polymer composition according to claim 1, wherein R and R' are individually an alkyl group having 3–12 carbon atoms.

4. A polymer composition according to claim 3, wherein R and R' are individually butyl or octyl.

5. A polymer composition according to claim 1, wherein X is fluorine, chlorine, bromine, or iodine.

6. A polymer composition according to claim 5, wherein X is chlorine.

7. A polymer composition according to claim 1, wherein h is 2 and j is 1 in formula I; both k and m are different from 0 and at least one of l and n is 1 in formula II.

8. A polymer composition according to claim 1, wherein the composition comprises 0.001–3% by weight of the silanol condensation catalyst based on the amount of silanol-group containing polymer in the composition.

9. A polymer composition according to claim 1, comprising a second silanol condensation catalyst, the second silanol condensation catalyst comprising:

a carboxylic acid salt of tin, zinc, iron, lead or cobalt;

an organic base;

an organic acid; or an organic acid.

10. A polymer composition according to claim 9, wherein the organic acid is an organic sulphonic acid.

* * * * *